United States Patent [19]
Boltz et al.

[11] Patent Number: 5,423,122
[45] Date of Patent: Jun. 13, 1995

[54] ASSEMBLY OF A MOTOR-VEHICLE LATENT-HEAT STORAGE UNIT

[75] Inventors: Hartmut Boltz, Brey; Richard Christ, Emmelshausen; Karl-Josef Jakobi, Geisenheim, all of Germany

[73] Assignee: Fritz Werner Prazisionsmaschinenbau GmbH, Geisenheim, Germany

[21] Appl. No.: 163,082

[22] Filed: Dec. 7, 1993

[30] Foreign Application Priority Data

Dec. 8, 1992 [DE] Germany .................. 42 41 317.6
Jul. 8, 1993 [DE] Germany .................. 43 22 813.5

[51] Int. Cl.$^6$ ............................................. B23P 15/26
[52] U.S. Cl. ......................... 29/890.054; 29/890.032
[58] Field of Search ............... 29/890.032, 890.054, 29/488; 165/104.14, 104.21, 133

[56] References Cited

U.S. PATENT DOCUMENTS

| | | | |
|---|---|---|---|
| 3,797,086 | 3/1974 | Asselman | 29/890.032 |
| 4,018,269 | 4/1977 | Honda et al. | 165/133 |
| 4,106,171 | 8/1978 | Basiulis | 29/890.032 |
| 4,196,504 | 4/1980 | Eastman | 29/890.032 |
| 5,226,580 | 7/1993 | Hartle et al. | 29/890.032 |

FOREIGN PATENT DOCUMENTS

| | | | |
|---|---|---|---|
| 4108227 | 9/1992 | Germany . | |
| 0039246 | 3/1979 | Japan | 29/890.032 |
| 0150795 | 9/1982 | Japan | 29/890.032 |
| 0179589 | 11/1982 | Japan | 29/890.032 |

*Primary Examiner*—Irene Cuda
*Attorney, Agent, or Firm*—Herbert Dubno; Andrew Wilford

[57] ABSTRACT

A motor-vehicle latent-heat unit is made by first inserting into an evacuatable chamber a subassembly comprised of a closed inner housing having upper and lower ends, a pack of medium-filled latent-heat storage cells contained in the inner housing, a side wall surrounding the inner housing and having upper and lower ends, and a floor closing the lower end of the side wall and juxtaposed with the lower inner-housing end. The upper end of the side wall is open. Then the chamber is evacuated and an upper wall or cover is fitted to the upper end of the side wall and is bonded thereto. This forms with the upper wall, floor, and side wall an outer housing in turn forming around the inner housing a closed and evacuated space. The chamber is then refilled with air around the outer housing and the housings are removed from the chamber.

11 Claims, 2 Drawing Sheets

ASSEMBLY OF A MOTOR-VEHICLE LATENT-HEAT STORAGE UNIT

FIELD OF THE INVENTION

The present invention relates to the assembly of a latent-heat storage unit. More particularly this invention concerns such a unit incorporating heat pipes and used in a motor vehicle.

BACKGROUND OF THE INVENTION

A standard latent-heat storage unit of the type used in a motor vehicle comprises a closed inner housing having upper and lower ends, a pack of latent-heat storage pipes or cells contained in the inner housing, and an outer housing containing the inner housing and having a floor juxtaposed with the lower inner-housing end and a top wall juxtaposed with the upper inner-housing end. The outer housing forms around the inner housing a space that is substantially empty of gas. Inlet and outlet pipes pass through the space into the inner housing so a heat-exchange fluid can be circulated through the inner housing which is otherwise effectively insulated from its surroundings by the surrounding vacuum. The confronting inner and outer surfaces of the outer and inner housings, respectively, are also normally mirrored to further thermally isolate the core.

Such a device is mass produced as described in German patent document 4,108,227. It is employed in the cooling system between the engine and the car-interior heating equipment. Typically the assembly of the finished unit is a task involving substantial manual manipulation so that it is fairly complex and expensive. Since this item is going into a product—a car or truck—that must be produced at the lowest possible unit cost, this expensive assembly operation is therefore a problem.

OBJECTS OF THE INVENTION

It is therefore an object of the present invention to provide an improved method for assembling a motor-vehicle latent heat storage unit.

Another object is the provision of such an improved method for assembling a motor-vehicle latent-heat storage unit which overcomes the above-given disadvantages, that is which is relatively simple and inexpensive to run.

A further object is to provide an improved motor-vehicle latent-heat storage unit.

SUMMARY OF THE INVENTION

A motor-vehicle latent-heat unit is made according to the invention by first inserting into an evacuatable chamber a subassembly comprised of a closed inner housing having upper and lower ends, a pack of medium-filled latent-heat storage cells contained in the inner housing, a side wall surrounding the inner housing and having upper and lower ends, and a floor closing the lower end of the side wall and juxtaposed with the lower inner-housing end. The upper end of the side wall is open. Then the chamber is evacuated and an upper wall or cover is fitted to the upper end of the side wall and is bonded thereto. This forms with the upper wall, floor, and side wall an outer housing in turn forming around the inner housing a closed and evacuated space. The chamber is then refilled with air around the outer housing and the housings are removed from the chamber.

Thus the assembly can be made according to this invention in a very simple manner simply by providing the already required vacuum chamber with equipment to mount the necessary outer-housing cover. The cover can be fitted to the top of the outer housing while the chamber is being pumped out, so that this operation in no way adds to production time. In fact it is theoretically possible to put the outer housing into the chamber with the cover loosely in place and the mechanism inside the vacuum chamber simply lifts up this cover during the start of the evacuation process, then reseats it on the outer housing prior to the bonding step. The bonding, typically a soldering operation, is carried out under vacuum to seal off the interior of the outer housing under vacuum. Of course the inlet and output pipes for the storage cells in the inner housing extend out of the outer housing in a gastight manner through the lower wall thereof, traversing the vacuum space surrounding the inner housing.

According to the invention the chamber is evacuated to a subatmospheric pressure of about $10^{-6}$ millibars, preferably $10^{-7}$ millibars to $10^{-9}$ millibars. Furthermore both housings are substantially cylindrical and coaxial so that the space between them is cylindrically annular.

In accordance with a further feature of this invention a compressible seal ring is interposed between the upper wall and the side-wall upper edge so that, when the chamber is refilled, vacuum in the space will pull the top wall down onto the side-wall upper end. This provides a self-sealing effect. Furthermore a ring of solder is provided between the upper wall and the side-wall upper end and the upper wall is bonded to the side wall by heat fusing and thereafter cooling the solder. This can be done inductively by heating the normally steel cover and outer-housing side wall and thereby conductively heating the solder.

Since the surfaces of the various metal parts invariable trap some gas and, in fact, steel itself frequently has some moisture content, according to the invention an activatable high-vacuum getter or scavenger element is provided in the space. It is activated after evacuating the chamber and before refilling the chamber so that it does not lose potency before it is needed. This element can be provided at the upper end of the outer-housing side wall and/or centrally on the upper wall offset from the upper end of the side wall. The getter element is activated by heating it to a lower temperature than a temperature to which the solder is heated to bond the upper wall to the side-wall upper end. Thus as the parts are heated up to melt the solder, the getter is automatically activated. Since it only starts working after the vacuum around it is relatively high, it can be counted on to have a long service life.

Such getters are typically made of elements that absorb and or bond with free gases, being so-called molecular sponges. They are usually metals of the first, second, and third main groups of the periodic chart or alloys or compounds of these metals. When hydrogen is a problem, a titanium-based getter is used.

The parts can also be outgassed during evacuation of the chamber by heating the outer housing to about 400° C. and the inner housing to about 200° C. More particularly after substantial completion of the evacuation but before full completion of the evacuation of portions of the outer housing side wall and upper wall at the upper end are heated for at least 1 sec to 1000° C. and are thereafter maintained at at least 700° C. for at least 1 min. Once the soldering operation is completed, temperatures are maintained for several minutes about 400° C. to draw off any gases produced by the soldering operation, while the vacuum pump is kept on to take out these outgases.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
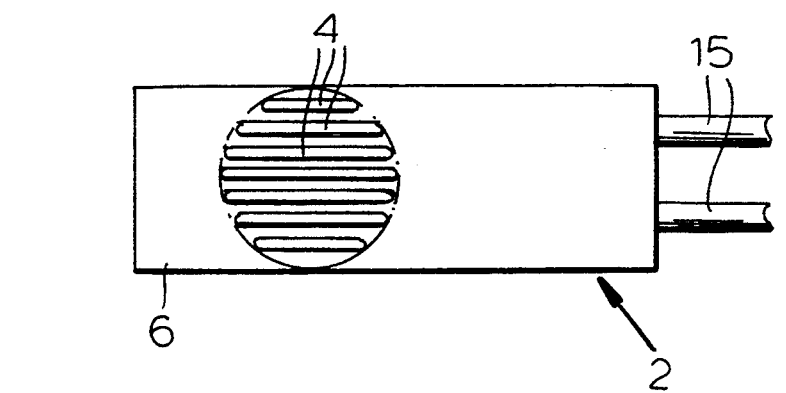
FIG. 1 is a side view partly in section showing the core of the latent-heat storage unit of this invention.

As seen in FIG. 1 a core 2 of a latent-heat storage unit comprises a cylindrical inner housing 6 containing a pack of latent-heat storage cells or pipes 4 of the type described in jointly filed application Ser. No. 08/163,081 filled 7 Dec. 1993. The housing 6 has flat and parallel end walls the lower of which is traversed by a pair of fluid-feed pipes 15. The outer surface of the housing 6 is mirrored.

Figure 2:
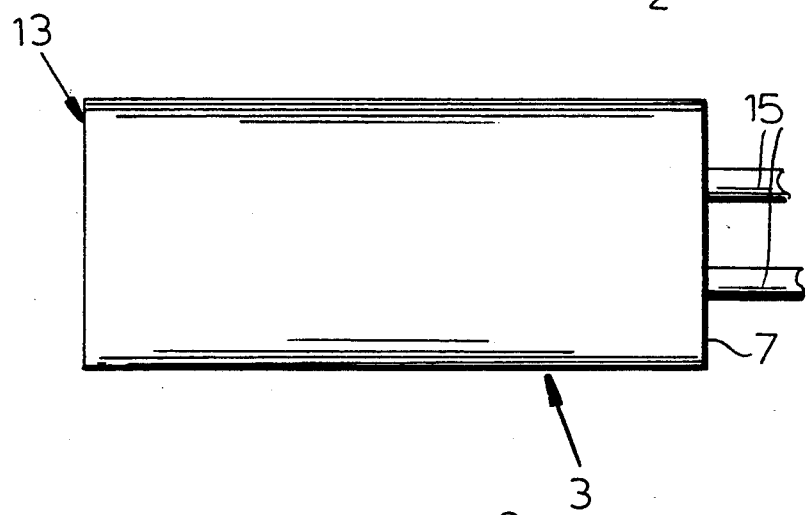
FIG. 2 is a side view of the completed unit.
Figure 3:
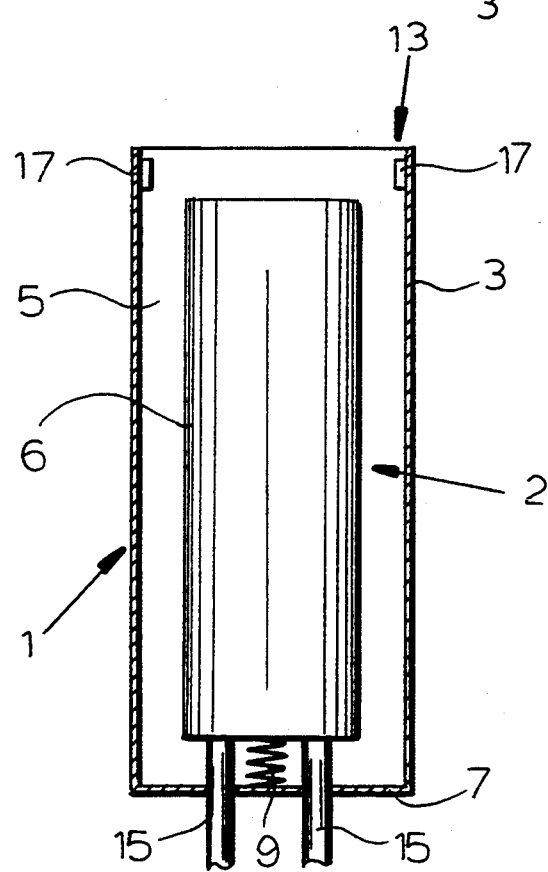
FIG. 3 is an axial section through a partly assembled unit.
Figure 4:
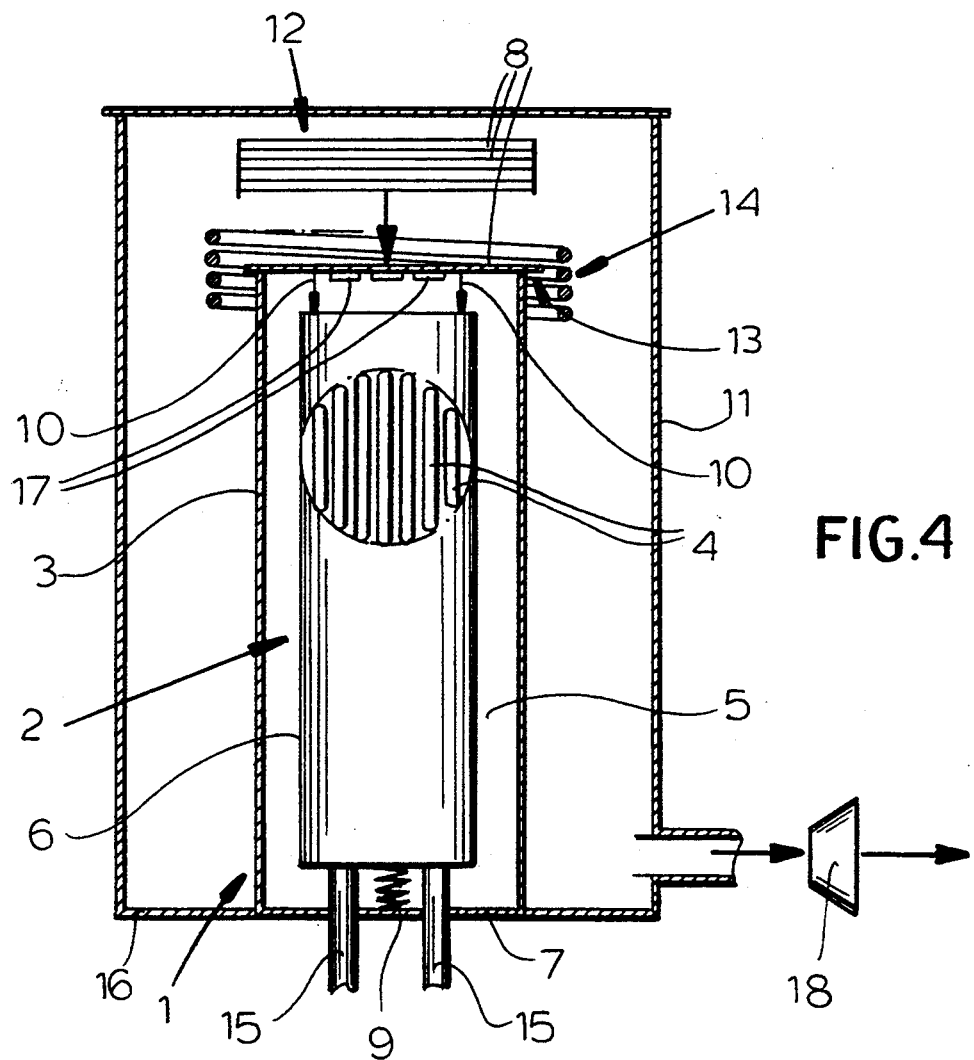
FIG. 4 is an axial section through the apparatus used for carrying out the assembly method of this invention.

The complete storage unit also comprises as seen in FIGS. 2 through 4 an outer housing 3 of cylindrical shape but greater length and diameter than the inner housing 6 to form a space 5 therearound. This outer housing 3 is unitarily formed with a flat bottom wall or floor 7 through which the pipes 15 pass gastightly and a flat cover or top wall 8. The inner surface of the housing 3 is mirrored. A spring 9 engaged between the lower end of the inner housing 6 and the lower wall or floor 9 of the outer housing 3 presses the upper end of the core 2 against abutments 10 on the upper wall 8 of the outer housing 3, but the side walls of both housings 3 and 6 are wholly out of physical contact with each other In the finished unit, the space 5 is evacuated and may be provided with a getter or scavenger element 17 to absorb any gases therein.

Such a unit or module is made according to the invention by first putting together a subassembly such as shown in FIG. 3, which includes all the above-described parts of the core 2 except the cover or upper wall 8, which may centrally carry the getter blocks 17. Thus the outer housing has an open upper end or edge 13. This subassembly is installed in a vacuum chamber 11 provided with a loading device or supply 12 of the covers 8 and with an inductive heating coil 14. Once in the chamber 11, a pump 18 is actuated to evacuate it and the supply 12 fits to the top edge of the housing 3 a cover 8. The feed pipes 15 of the core 2 project out through a floor 16 of the chamber 11.

Figure 5:
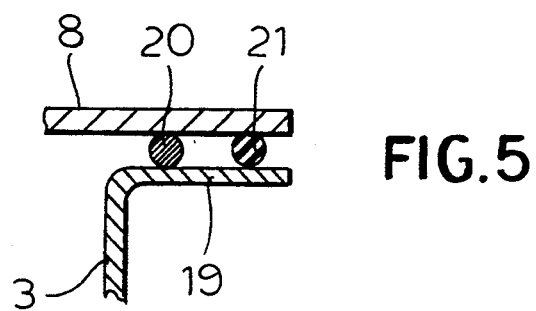
FIG. 5 is a large-scale sectional view of a detail of the finished storage unit.

Each cover 8 is a flat circular metal disk having an outer periphery provided as seen in FIG. 5 with an annular solder ring 20 and an annular seal ring 21. The upper end 13 of the side wall of the housing 3 has a turned out circularly annular lip or rim 19 of the same outside diameter as the cover disk 8. When fitted to the rim 19, the two rings 20 and 21 sit solidly thereon.

Once the vacuum has reached a fairly high level, the coil 14 is energized to heat the region of the solder ring 20 and melt it. This heating also causes the metals of the various parts to outgas, and the driven off gases are carried away by the pump 18. Furthermore as the getter elements 17 are heated they are activated. Normally the getter elements 17 are only heated to about 800° C. to 900° C. to activate them, while the solder regions are heated to 1000° C. for best bonding.

In fact before the solder is actually melted, the entire unit is heated to 200° to 400° C. to outgas the parts, while of course running the vacuum pump to evacuate the gases, typically hydrogen, pulled out of the metal parts.

After some heating time, the solder is allowed to cure and the pump 18 is turned off, which allows the chamber 11 to refill with air at ambient temperature and pressure. The vacuum in the space 5 will suck the cover 8 down on the seal 21 for a very tight connection of the cover 8 to the rim 19 even if the solder is not fully hard. The completed unit can be installed between the cooling system and engine of a motor vehicle.

We claim:

1. A method of assembling a motor-vehicle latent-heat unit comprising the steps of:
    inserting into an evacuatable chamber a subassembly comprising
        a closed inner housing having upper and lower ends,
        a pack of medium-filled latent-heat storage cells contained in the inner housing,
        a side wall surrounding the inner housing and having upper and lower ends, the upper end of the side wall being open, and
        a floor closing the lower end of the side wall and juxtaposed with the lower inner-housing end;
    evacuating the chamber;
    fitting to the upper end of the side wall an upper wall and bonding the upper wall to the upper end to form with the upper wall, floor, and side wall an outer housing that in turn forms a closed and evacuated space around the inner housing; and
    refilling the chamber with air around the outer housing and removing the housings from the chamber.

2. The assembly method defined in claim 1 wherein the chamber is evacuated to a subatmospheric pressure of about $10^{-6}$ millibars.

3. The assembly method defined in claim 1 wherein both housings are substantially cylindrical and coaxial.

4. The assembly method defined in claim 1, further comprising the step of
    interposing a compressible seal ring between the upper wall and the side-wall upper edge, whereby, when the chamber is refilled, vacuum in the space will pull the top wall down onto the side-wall upper end.

5. The assembly method defined in claim 1, further comprising the step of
    providing a ring of solder between the upper wall and the side-wall upper end, the upper wall being bonded to the side wall by heating and thereafter cooling the solder.

6. The assembly method defined in claim 5 wherein the solder is heated inductively.

7. The assembly method defined in claim 5, further comprising the steps of:
    providing an activatable high-vacuum getter element in the space; and activating the getter element after evacuating the chamber and before refilling the chamber.

8. The assembly method defined in claim 7 wherein the getter element is provided at the upper end of the outer-housing side wall.

9. The assembly method defined in claim 7 wherein the getter element is provided centrally on the upper wall offset from the upper end of the side wall, the getter element being activated by heating it to a lower temperature than a temperature to which the solder is heated to bond the upper wall to the sidewall upper end.

10. The assembly method defined in claim 7, further comprising the step of
heating the outer housing to about 400° C. and the inner housing to about 200° C. during the evacuation of the chamber.

11. The assembly method defined in claim 1, further comprising the step after substantial completion of the evacuation but before full completion of the evacuation of
heating portions of the outer housing side wall and upper wall at the upper end for at least 1 sec to 1000° C. and thereafter maintaining the heated portions at at least 700° C. for at least 1 min.

* * * * *